United States Patent [19]
Shen et al.

[11] Patent Number: 5,182,728
[45] Date of Patent: Jan. 26, 1993

[54] ULTRASOUND IMAGING SYSTEM AND METHOD

[75] Inventors: Michael C. S. Shen, Tempe; Christopher P. Zobkiw, Scottsdale, both of Ariz.

[73] Assignee: Acoustic Imaging Technologies Corporation, Phoenix, Ariz.

[21] Appl. No.: 723,459

[22] Filed: Jun. 28, 1991

[51] Int. Cl.$^5$ .............................................. G03B 42/06
[52] U.S. Cl. ........................................ 367/7; 367/11; 364/413.25
[58] Field of Search ................. 367/7, 11; 128/660.01; 73/606; 364/413.25, 413.13, 413.22, 413.19; 340/709, 716, 721, 731

[56] References Cited

PUBLICATIONS

Schnapp et al., SuperPaint 1.1 Manual, 1987, pp. 73–74.
Gillespie, Magnify, 1989.

*Primary Examiner*—Daniel T. Pihulic
*Attorney, Agent, or Firm*—Christie, Parker & Hale

[57] ABSTRACT

A foreground image is overlaid over a background image on a visual display. Specifically, an ultrasound signal is transmitted toward a target to be displayed in two dimensions. Echoes of the ultrasound signal are received from the target. Two-dimesional target data acquired from the received echoes are stored. The two-dimensional target data are presented on the visual display as a background image. Part of the target data are overlaid over the background image as a foreground image on the visual display. The size of the foreground image vis-a-vis the background image is changed by the user to permit better observation of an area of interest. Preferably, the size of the foreground image is changed without changing the area occupied by the foreground image on the visual display, which permits the invention to simulate the action of a magnifying glass. The user moves a cursor on the visual display to the center of an area of interest. The user then opens up a window about the cursor to define the length and width of the foreground image on the visual display, while observing the target data presented on the visual display. The user can then magnify the size of the foreground image centered on the cursor, change the dimensions of the window, and/or change the location of the cursor to move the area of interest, without disturbing the background image.

9 Claims, 6 Drawing Sheets

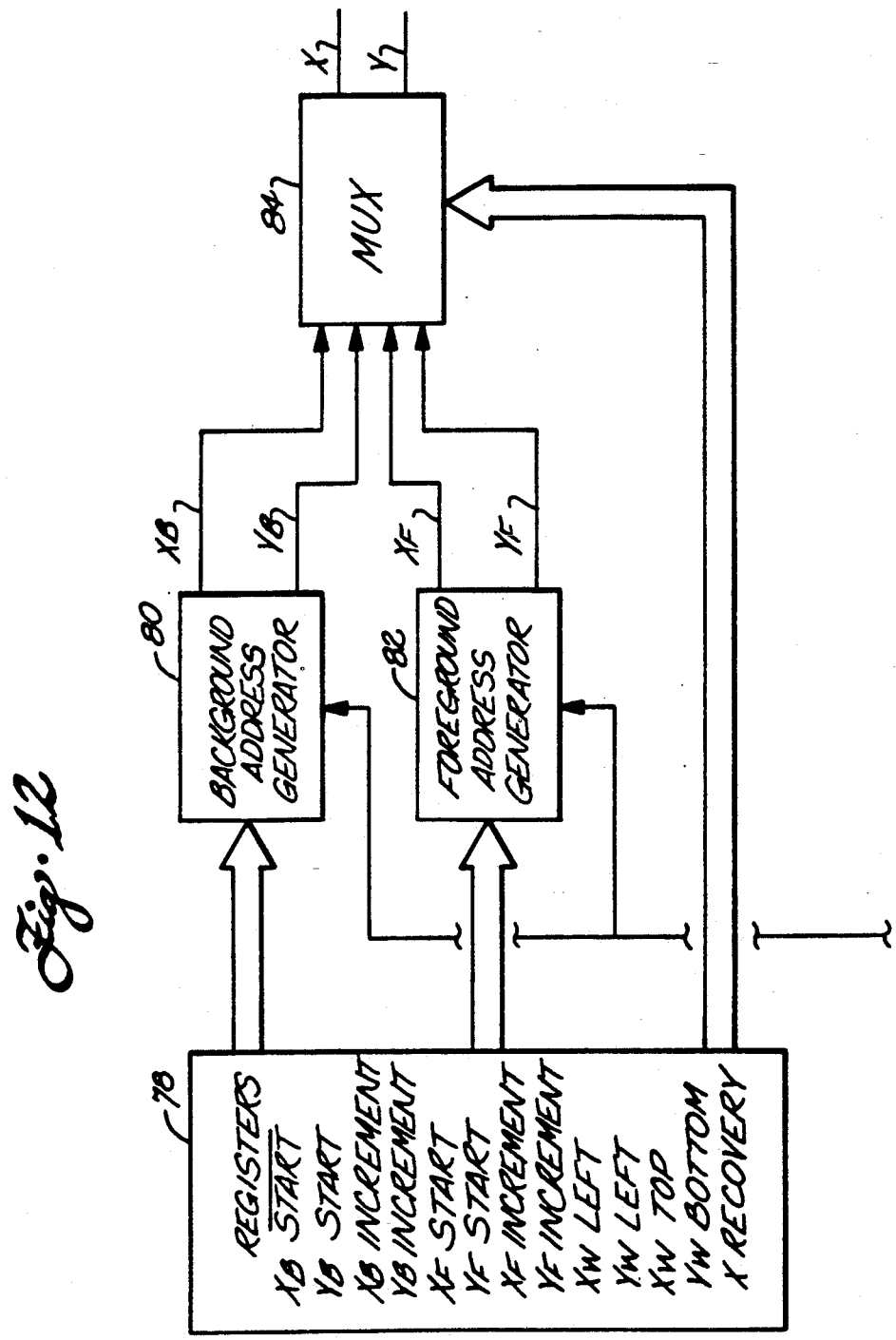

ULTRASOUND IMAGING SYSTEM AND METHOD

The specification incorporates microfiche Appendices A and B, comprising a total number of 2 microfiche and a total number of 87 frames.

BACKGROUND OF THE INVENTION

This invention relates to ultrasound imaging and, more particularly, to a technique for selectively magnifying an area of interest in an ultrasound image.

There are various known techniques for magnifying an ultrasound B-mode image. These techniques do not allow the user to focus continuously on an area of interest while magnifying i.e., expanding the image.

One technique is to magnify or expand the image to the desired degree while occuping the entire visual display area, and then scroll or pan until the area of interest appears on the visual display. It is difficult for the user to retain the proper perspective of the image during the scroll or pan operation.

In another technique, the user draws a box around the area of interest of the image and then expands it to fill the entire visual display. If the user wishes to move the area of interest, these operations must be repeated, which is time consuming and distracting.

A third technique splits the visual display into two halves. The user draws a box around the area of interest of the image in one-half of the visual display. This area of interest in magnified form is presented on the other half of the visual display. To move the area of interest the user must draw another box. The degree of magnification is also limited by the ratio of the area of the box to the area of the split image.

SUMMARY OF THE INVENTION

According to the invention, a foreground image is overlaid over a background image on a visual display. Specifically, an ultrasound signal is transmitted toward a target to be displayed in two dimensions. Echoes of the ultrasound signal are received from the target. Two-dimensional target data acquired from the received echoes are stored. The two-dimensional target data are presented on the visual display as a background image. Part of the target data are overlaid over the background image as a foreground image on the visual display. The size of the foreground image vis-a-vis the background image is changed by the user to permit better observation of an area of interest. Preferably, the size of the foreground image is changed without changing the area occupied by the foreground image on the visual display, which permits the invention to simulate the action of a magnifying glass.

The user moves a cursor on the visual display to the center of an area of interest. The user then opens up a window about the cursor to define the length and width of the foreground image on the visual display, while observing the target data presented on the visual display. The user can then magnify the size of the foreground image centered on the cursor, change the dimensions of the window, and/or change the location of the cursor to move the area of interest, without disturbing the background image. As a result, the user can focus in on specific areas of the target data without losing perspective.

It is a feature of the invention to permit the window to be moved around the visual display without changing the overlaid part of the target data. In this way, the foreground image can be set aside of the background image so the entire background image can be displayed simultaneously with the foreground image, if desired. A new window can then be established on the background image over the area where the set aside foreground image was extracted. The new window can also be moved to change the foreground image. The size of the set aside foreground image can be changed at any time by the user, which will effect a corresponding change in the size of the new window.

BRIEF DESCRIPTION OF THE DRAWINGS

The features of specific embodiments of the best mode contemplated of carrying out the invention are illustrated in the drawings in which:

FIG. 12 is a schematic block diagram of the address generator of FIG. 11.

DETAILED DESCRIPTION OF THE SPECIFIC EMBODIMENTS

Figure 1:
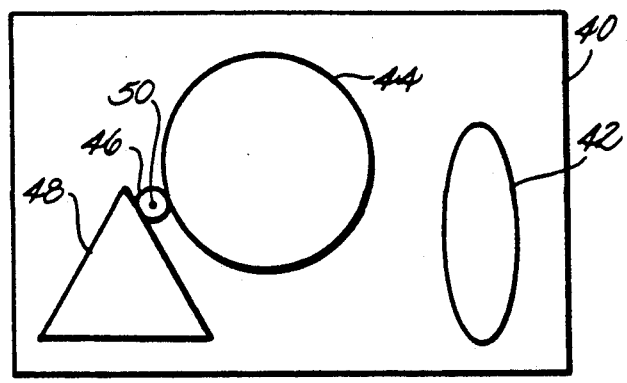
FIGS. 1 to 4 are diagrams of a rectilinear visual display illustrating the principals of the invention.

FIG. 1 depicts a visual display such as the screen of a video display terminal 40. Objects 42, 44, 46 and 48 are presented on video display 40 as a rectilinear background image. Objects 42 to 48 represent two-dimensional target data acquired from received ultrasound echoes. To use the invention, a medical diagnostician positions a cursor 50 at the center of an area of interest on visual display 40.

Figure 2:
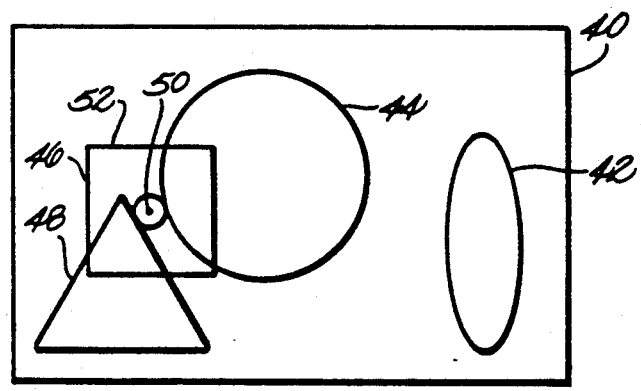
Figure 3:
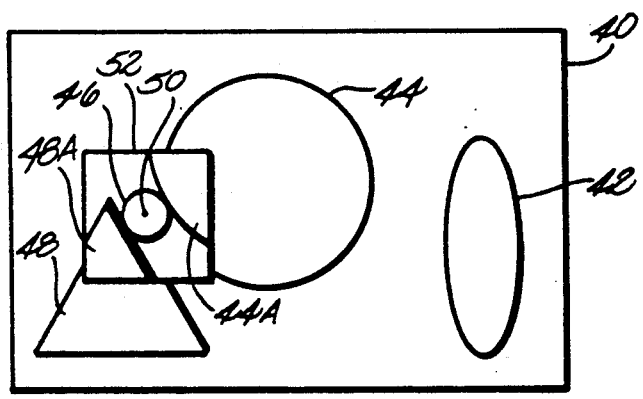

As illustrated in FIG. 2, the user next opens a window or frame 52, centered about cursor 50. The length and width of this window 52 define the dimensions of a foreground image overlaid on the background image. The background image can be expanded before or after overlaying the foreground image on visual display 40. Once the window is defined as shown in FIG. 2, the size of the foreground image centered about cursor 50 can be changed. As shown in FIG. 3, the foreground image is expanded, i.e., magnified, by enlarging object 46, part of object 44, depicted as 44A, and part of object 48, depicted as 48A.

Figure 4:
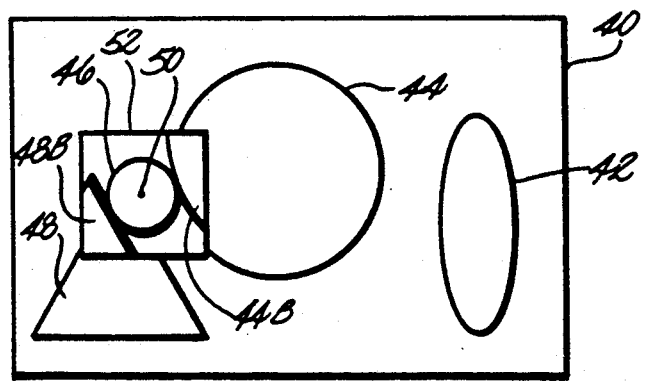

As depicted in FIG. 4, the foreground image can be further expanded, i.e. magnified, thereby further increasing the size of object 46; a smaller part of object 44, designated 44B; and a smaller part of object 48, designated 48B. By comparing FIGS. 2, 3 and 4, it will be observed that the foreground image simulates the action of a magnifying glass in that the objects within window 52 are enlarged. A smaller part of objects partially within the window are displayed as the foreground is expanded. The extent of magnification, the dimensions of window 52, and the position of the center of the area of interest can each be separately changed to selectively focus on and magnify any area of interest of the two dimensional target data.

Figure 5:
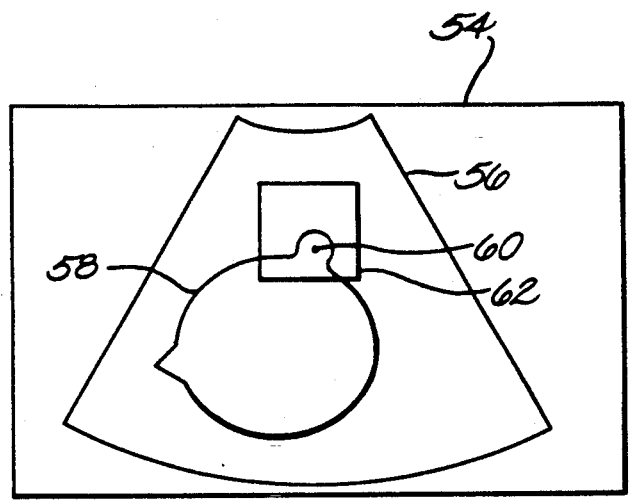
FIGS. 5 to 9 are diagrams of a sector visual display illustrating the principles of the invention.

FIG. 5 represents a visual display 54 such as the screen of a video display terminal. Two dimensional target data are presented as a sectorial background image 56, including an object 58. The user positions a cursor 60 to the center of an area of interest and opens up a window 62 to define the dimensions of a foreground image.

Figure 6:
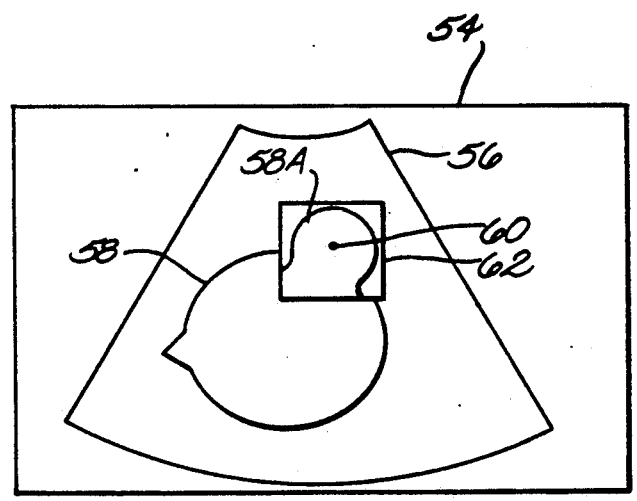

As illustrated in FIG. 6, the foreground image can be expanded to magnify a portion 58A of object 58.

Figure 7:
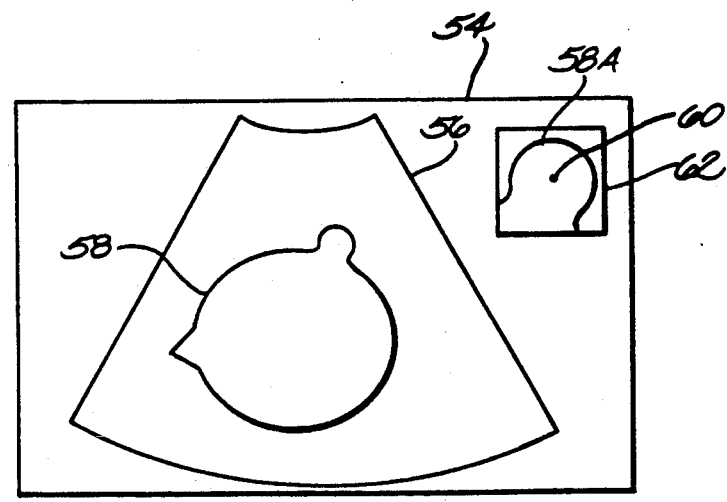

FIG. 7 illustrates another feature of the invention, namely that window 62 can be moved about visual display 54 without changing the foreground image so as to enable the user to see the entire background image along with the set aside foreground image, if desired.

Figure 8:
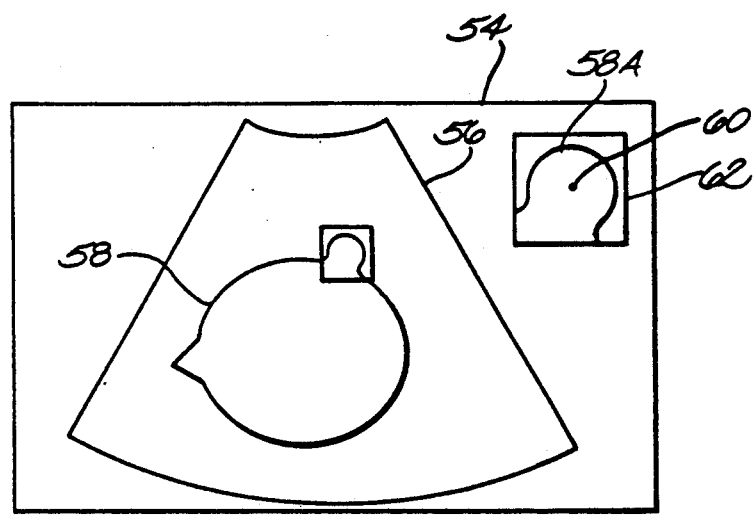

In FIG. 8, a new window 63 is established on the background image in the area where the set aside foreground image was derived, i.e., the area occupied by portion 58A. As illustrated, since the foreground image is magnified, new window 63 on the background image is smaller than window 62.

Figure 9:
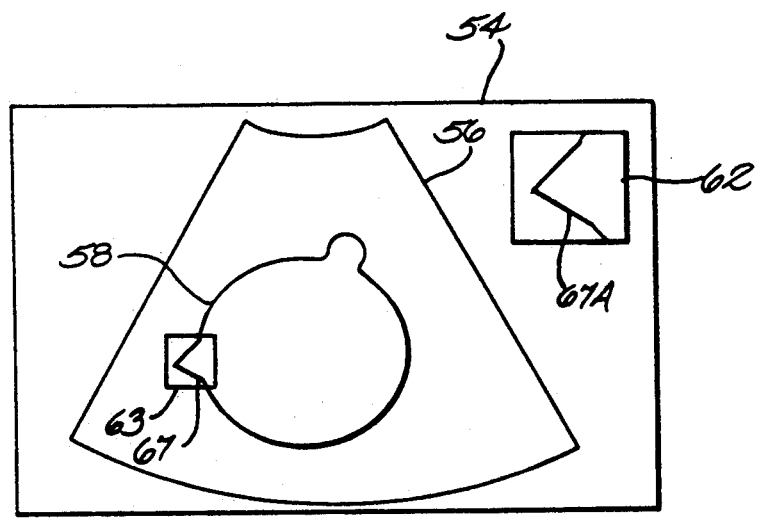

As depicted at 65 in FIG. 9, the new window itself can be moved around on the background image, and the set aside foreground image changes to reflect the location of the new window with the same extent of magnification. For example, a portion 67 of object 58 in the background image appears magnified as portion 67A in the set aside foreground image of window 62. The extent of magnification of the foreground image can be changed and the size of window 63 varies accordingly. Thus, the user can change the magnification and/or location of the foreground image, while observing the new window on the background image to orient him or herself on the object being observed, i.e., to put the foreground image into perspective vis-a-vis the background image.

Figure 10:
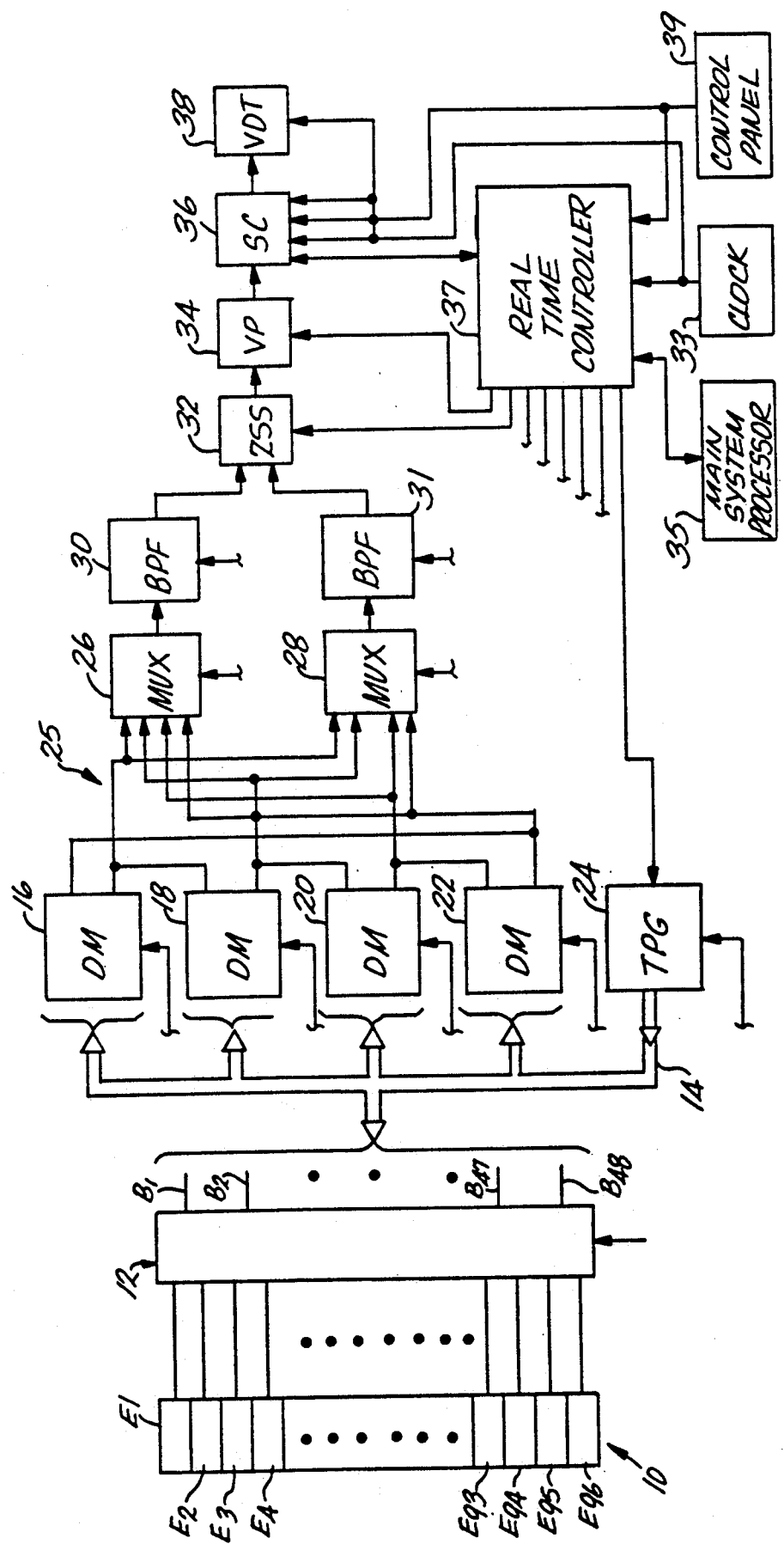
FIG. 10 is a schematic block diagram of an ultrasound imaging system with which the invention is used.

FIG. 10 shows an ultrasound imaging system with which the invention is intended to operate. The disclosure of copending application Ser. No. 07/415,405, filed on Sep. 29, 1989, now U.S. Pat. No. 4,955,770 which describes this ultrasound imaging system in detail, is incorporated herein fully by reference. Briefly, an ultrasound transducer array head 10 is connected to a transmit/receive element selection, multiplexing network 12. Network 12 is connected by a bidirectional bus 14 to identical programmable delay modules 16, 18, 20 and 22, and to a transmit pulse generator 24. A daisy bus 25 connects delay modules 16 to 22 to multiplexer switches 26 and 28. Bandpass filters 30 and 31 connect switches 26 and 28, respectively, to a zone select switch 32. Zone select switch 32 is connected to a video processor 34. The output of video processor 34 is connected to a scan converter 36. Scan converter 36 is connected to a video display terminal 38. The described apparatus is driven by a real time controller 37. A clock 33 is connected to scan converter 36 and video display terminal 38. A main system processor 35 is connected to real time controller 37. A control panel 39 serves as an interface between the user and the described components including scan converter 36. The described system transmits an ultrasound signal toward a target to be displayed in two dimensions and receives echoes of the ultrasound signal from the target. The two dimensional target data acquired from the received echoes is stored in scan converter 36. Video display terminal 38 serves as a visual display for presenting the two dimensional target data.

Figure 11:
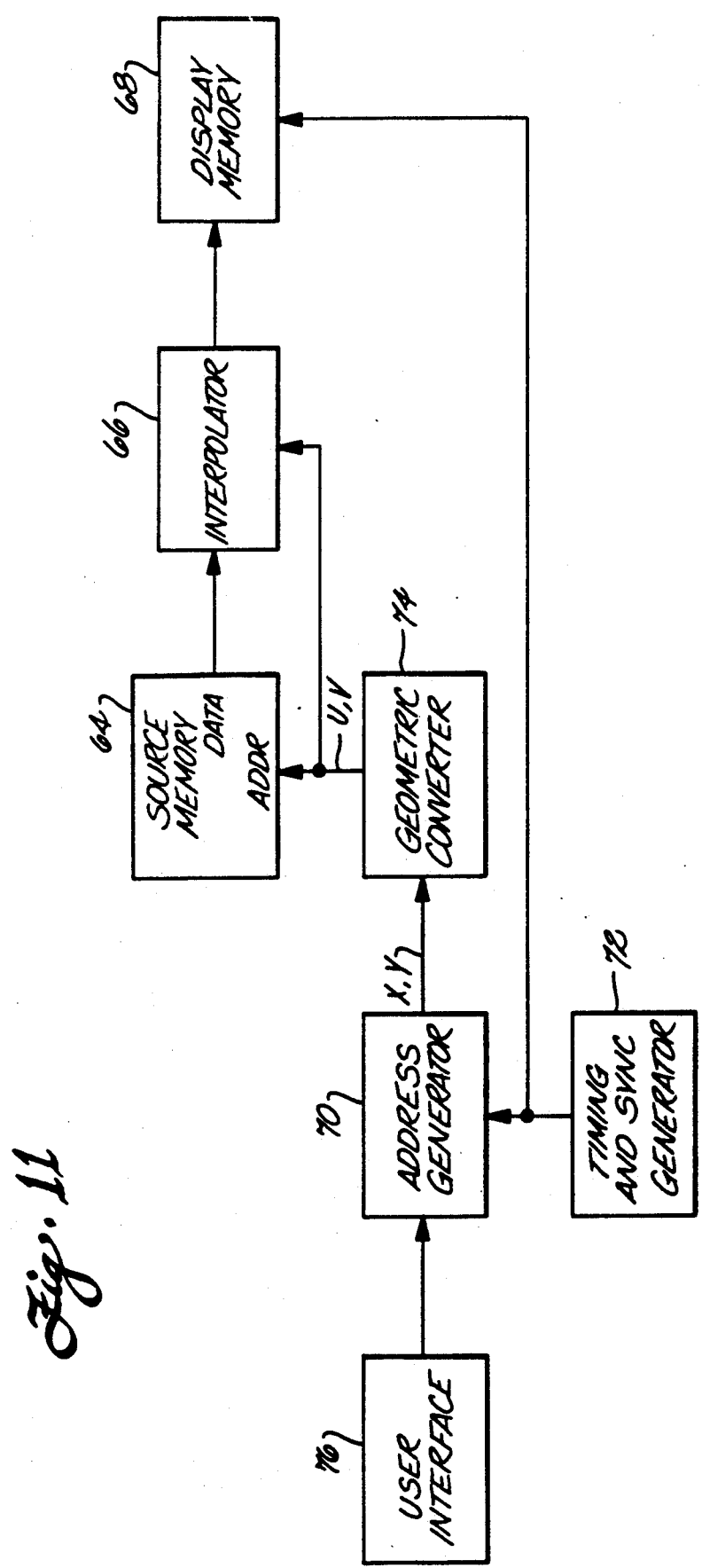
FIG. 11 is a schematic block diagram of a scan converter incorporating principles of the invention.

To practice the invention, a conventional scan converter as disclosed for example in U.S. Pat. No. 4,581,636 issued on Apr. 8, 1986, the disclosure of which is incorporated fully herein by reference, is modified to permit a foreground image to be overlaid over the background image as described in connection with FIGS. 1 to 7. FIG. 11 illustrates the scan converter used to practice the invention. The two dimensional target data acquired from the received echoes is stored in a source memory 64 in the format in which the data are acquired e.g., in a polar coordinate system if a sector scanning transducer is used or a rectangular coordinate system if a straight scanning transducer is used. The data output of memory 64 is coupled by an interpolator 66 to a display memory 68. The two dimensional target data are stored in display memory 68 in the format in which it is read out to control the visual display. In other words, target data are stored in memory 68 so that it can be read out in synchronism with the raster scan of a video display terminal to modulate its beam and thereby form the images thereon. Interpolator 66 serves to interpolate the target data between the discrete data point stored in memory 64 as the image is magnified. Address generator 70 produces X and Y addresses corresponding to the data in the display format in synchronism with the visual display. Thus, a timing and sync generator 72, which is synchronized to clock 33 (FIG. 10) is connected to address generator 70 and to display memory. A geometric converter 74 converts the X and Y addresses into U and V addresses, which represent the data in the format in which it is stored in source memory 64. The U and V addresses are applied to an address (ADDR) input of source memory 64 to retrieve the data to be displayed at the visual display location corresponding to the X and Y addresses. A user interface 76 represents the part of control panel 39 (FIG. 10) related to the selection of the background and foreground images on the visual display. Responsive to user interface 76, address generator 70 produces one series of X and Y addresses for the background image and another series of X and Y addresses for the foreground image. Only one of these two series of addresses is coupled to geometric converter 74 at a time, depending upon whether the background image or the foreground image is being presented on the visual display.

Address generator 70 can be implemented by programming a special purpose computer or a general purpose microcomputer, such as a PC. A typical source code listing for implementing this function on a PC in C language is shown in microfiche Appendix A. FIG. 12 illustrates the function of address generator 70. The parameters for calculating the two series of X and Y addresses and the timing of their application to geometric converter 74 are stored in a bank of registers 78. These parameters are calculated by user interface 76 based on the control settings established by the user. Registers 78 are coupled to a background address generator 80 which calculates $X_B$ and $Y_B$ as follows:

$$X_B = X_B \text{ START} + (X_B \text{ INCREMENT} * n_h) \text{ and}$$

$$Y_B = Y_B \text{ START} + (X_B \text{ INCREMENT} * n_v),$$

where $X_B$ is the background X address, $Y_B$ is the background Y address, $X_B$ START is the initial value of the X address for the background image, $Y_B$ START is the initial value of the Y address for the background image, $X_B$ INCREMENT is the X scaling value for the background image, $Y_B$ is the Y scaling value for the background image, $n_h$ is the current raster horizonal pixel coordinate and $n_v$ is the current raster vertical scan line coordinate. Registers 78 are also coupled to a foreground address generator 82, which calculates $X_F$ and $Y_F$ as follows:

$$X_F = X_F \text{ START} + (X_F \text{ INCREMENT} * n_h) \text{ and}$$

$$Y_F = Y_F \text{START} + (X_F \text{INCREMENT} * n_v),$$

where $X_F$ is the foreground X address, $Y_F$ is the foreground Y address, $X_F$ START is the initial value of the X address for the foreground image, $Y_F$ START is the initial value of the Y address for the foreground image, $X_F$ INCREMENT is the X scaling value for the foreground image, $Y_F$ INCREMENT is the Y scaling value for the foreground image, $n_h$ is the current raster horizonal pixel coordinate and $n_v$ is the current raster vertical scan line coordinate. Address generator 80 and 82 are coupled to a multiplexer (MUX) 84, which selects either the background or the foreground addresses, depending upon the current raster horizontal pixel and vertical scan line coordinates and the dimensions and location of the window. To this end, the proper switch control signals for multiplexer 84 are generated responsive to parameters $X_w$ LEFT, $X_w$ RIGHT, $Y_w$ TOP, $Y_v$ BOTTOM, and X RECOVERY, where $X_w$ LEFT is the X address of the left boundary of the window; $X_w$ RIGHT is the X address of the right boundary of the window; $Y_w$ TOP is the Y address of the top boundary of the window; $Y_w$ BOTTOM is the Y address of the bottom of the window; and X RECOVERY is the address at the end of the window where the background is reestablished.

Geometric converter 74 could be implemented in the manner described in connection with FIG. 7 of U.S. Pat. No. 4,581,636 and interpolator 66 could be implemented in the manner described in connection with FIGS. 10 and 11 of U.S. Pat. No. 4,581,636. Alternatively, the scan converter could be implemented as described in microfiche Appendix B.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention.

What is claimed is:

1. An ultrasound imaging system comprising:
   means for transmitting an ultrasound signal toward a target to be displayed in two dimensions;
   means for receiving echoes of the ultrasound signal from the target;
   means for storing two dimensional target data acquired from the received echoes;
   a visual display;
   means for presenting the two dimensional target data on the visual display as a background image;
   means for overlaying part of the target data over the background image as a foreground image on the visual display;
   means for changing the location of the foreground image on the visual display and for changing the overlaid part of the target data as the location changes; and
   means for changing the size of the foreground image vis-a-vis the background image.

2. The ultrasound imaging system of claim 1, in which the changing means changes the size of the foreground image without changing the area occupied by the foreground image on the visual display.

3. The ultrasound imaging system of claim 2, in which the location changing means retains the overlaid part of the target data as it changes the location.

4. A method for displaying two dimensional target data acquired from ultrasound echoes comprising the steps of:
   displaying a background image on the screen of a video display terminal that has a cursor;
   moving the cursor to the center of a selected area smaller than the entire image on the screen;
   opening a window on the screen around the center to define a foreground image that overlies the background image; and
   changing the size of the foreground image in the window.

5. The method of claim 4, additional comprising the step of moving the window across the background image to change the center of the selected area.

6. The method of claim 5, additional comprising the step of changing the dimensions of the window to correspondingly change the selected area.

7. The method of claim 4, additional comprising the step of changing the dimensions of the window to correspondingly change the selected area.

8. The method of claim 5, in which the size of the foreground image is held constant during the window moving step.

9. The method of claim 5, in which the size of the foreground image is held constant during the window dimension changing step.

* * * * *